(No Model.)
H. B. EVEREST.
WATER SPRINKLER.
No. 519,992. Patented May 15, 1894.
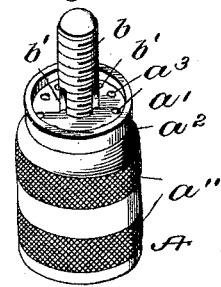
Fig. 1.
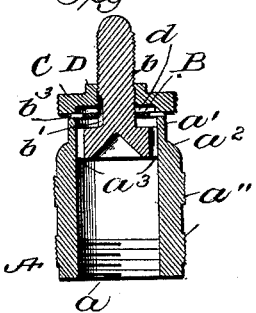
Fig. 2.
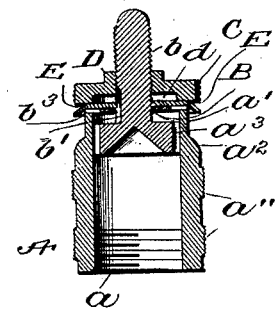
Fig. 3.
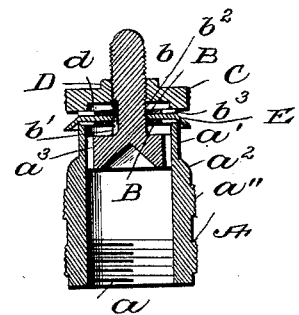
Fig. 4.
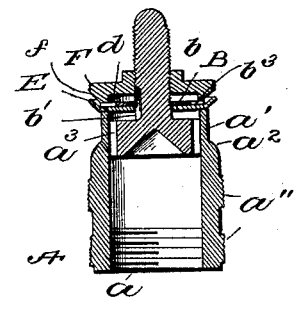
Fig. 5.
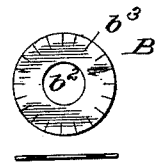
Fig. 6.
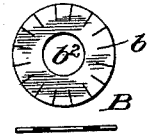
Fig. 7.
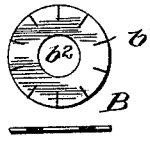
Fig. 8.
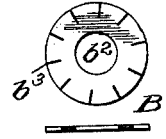
Fig. 9.
Fig. 10.
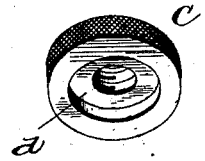
Fig. 11.
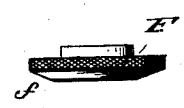
Fig. 12.
Fig. 13.
Witnesses
John Jamrie
Wm S. Hodges.
Inventor
Hiram B. Everest
By Emma M. Gillett
Attorney

UNITED STATES PATENT OFFICE.

HIRAM BOND EVEREST, OF RIVERSIDE, CALIFORNIA.

WATER-SPRINKLER.

SPECIFICATION forming part of Letters Patent No. 519,992, dated May 15, 1894.

Application filed November 22, 1893. Serial No. 491,650. (No model.)

*To all whom it may concern:*

Be it known that I, HIRAM BOND EVEREST, of Riverside, in the county of San Bernadino and State of California, have invented certain new and useful Improvements in Water-Sprinklers; and I do hereby declare the following to be a full, clear, and exact description of the invention, such as will enable others skilled in the art to which it appertains to make and use the same.

This invention relates to water sprinklers and it has for its object the production of a simple and inexpensive device of this nature for effectively and thoroughly distributing or spraying water in any direction, and also regulating the quantity or volume of the discharge.

The invention comprises a sprinkler having a series of diaphragms with various size slits through which more or less water may be passed according to the flow or form of spray desired.

The invention further comprises a sprinkler having slitted diaphragms for the passage of water and beveled or dished washers for directing the flow thereof.

The invention further comprises a sprinkler having a perforated cap and a central threaded rod provided with grooves or waterways, a series of diaphragms with various size slits, and a nut or nuts screwed on said rod and having a lower circular recess or chamber into which the water from said waterways strikes before passing out of the slits of an upper diaphragm, all substantially as hereinafter fully set forth and particularly pointed out in the claims.

In the accompanying drawings:—Figure 1 is a view in perspective of the body of the sprinkler, with parts omitted. Fig. 2 is a vertical sectional view of my sprinkler as used for effecting a horizontal discharge of the water. Fig. 3 is a similar view showing the arrangement for causing the water to flow outward and downward. Fig. 4 is a similar view of the arrangement for obtaining a downward and horizontal flow of water. Fig. 5 is a sectional view of the sprinkler as used for obtaining an upward and outward flow. Figs. 6 to 9 are plan and sectional views of the various diaphragms. Fig. 10 is a view of the beveled or dished washer. Figs. 11 and 12 are views of the nuts. Fig. 13 is a sectional view of the beveled washer with central recesses.

This sprinkler is specially designed to be used in connection with a system of pipes for spraying fruit trees with water so as to dissipate frost surrounding said trees by the heat given off by the water down to freezing point. Hence by means of my improved sprinkler I seek to regulate the outflow or discharge of the water so that it will fall directly into or beyond the branches and leaves or both into and beyond the tree at the same time and in any desired volume. While the sprinkler is specially designed for this purpose, yet I do not restrict myself in this particular.

Referring to the drawings, A designates the cylindrical body of the sprinkler having an interior thread $a$ for engaging the threaded end of a water-pipe, not shown. On the exterior are two milled circles $a$ so that the body can be readily turned by hand. The top or cap $a'$ of this body is set in a short distance from the outer edge $a^2$ and in it is a circular series of holes or perforations $a^3$. Extending centrally from this perforated top or cap is a threaded rod $b$ on the exterior of which are formed three, more or less, grooves or waterways $b'$ which extend from cap $a'$ a short distance outward on said rod.

B designates a series of diaphragms of more or less variation in thickness and having central holes $b^2$ and radial slits $b^3$ which extend from the periphery of the disk inward a short distance. These slits of the various diaphragms vary in size to a greater or less degree and by means thereof the volume of the outflow of water is regulated. One of these diaphragms B is placed down on rod $b$ and rests upon the circular edge $a^2$ and it is there firmly held by a nut C having a central hollow threaded boss D engaging said rod. In the under side of this nut is a circular recess or chamber $d$. When the nut is screwed home it will bind the diaphragm to its seat. Water being supplied to the sprinkler will pass out through the perforated cap and striking against the diaphragm will be ejected in sprays through the slits thereof. This is the arrangement shown in Fig. 2 and by means thereof the water will be discharged horizontally outward over the tree and beyond it. The size of the slits in the diaphragm regulates the flow or volume of the water. To distribute the water outward and downward over the limbs and leaves of the fruit trees, I employ a beveled or dished washer E located between the diaphragm and nut and placed with its curved edge downward. (See Fig. 3.) If it is desired to throw the water downward and horizontally a second slitted diaphragm B is placed between the inverted dished washer E and the nut, as shown in Fig. 4. The water passing through the grooves or water-ways of the central rod strikes into the central circular chamber of the nut and then passes out through the slits of the upper diaphragm, being discharged horizontally, while the water emitted through the lower diaphragm strikes against the inverted dished washer and falls downward. To cause the water to flow upward and outward the diaphragm and washer are arranged as shown in Fig. 5, that is, the washer is first placed in position with its curved edge upward and then the slitted diaphragm and lastly the nut F which is screwed tight to position. The edge $f$ of this form of nut is beveled, as shown. The water passing through the water-ways of the central rod will strike in the chamber of the beveled nut and then pass out through the slits of the diaphragm, the same as where two diaphragms are used with the beveled washer between them. If desired the beveled washer may have central recesses $g$. See Fig. 3.

The advantages of my invention are apparent and it is obvious that the parts can be readily interchanged and the flow of water in the desired direction easily secured. The number of slits in the diaphragms may be as many or as few according to the distribution desired; the thickness thereof may be more or less according to the volume of water it is desired to use to each tree, or the like. In practice, I find that a minimum thickness for the diaphragms to be about one-hundredth of an inch with slits of the same thickness. This gives holes for the water one-hundreth of an inch square each. From eight to twenty slits are in each diaphragm and are made preferably by a screw slitting saw, fifty to one hundred disks being screwed together on a mandrel and sawed at one operation on a screw-head cutting or milling machine.

It will be seen that by removing the nut, the water will flush out any sediment which may collect in the holes of the top or cap.

I claim as my invention—

1. A sprinkler of the class herein-described having a perforated top or cap, one or more removable diaphragms provided with slits of varying width, and a binding nut for holding said diaphragms in place, substantially as set forth.

2. A sprinkler of the class herein-described having a perforated top or cap, a removable slitted diaphragm designed to fit over the said top or cap, a removable beveled or dished washer designed to be held next to said diaphragm, and a nut for holding said washer and diaphragm in place, substantially as set forth.

3. A sprinkler having a perforated top or cap and a central threaded rod having grooves or water-ways, one or more slitted diaphragms designed to fit down over said perforated top or cap, and a nut screwed on said rod and having a lower central recess or chamber, as and for the purpose set forth.

4. The herein-described improved sprinkler, comprising the body having a perforated top or cap and central threaded rod provided with grooves or water-ways, one or more slitted diaphragms having central holes, a beveled or dished washer, and a nut having a central threaded hole and a lower chamber, as set forth.

5. The combination with the body having a perforated top or cap and a central threaded rod provided with grooves, of the slitted diaphragm, the dished washer, and the nut having a lower beveled edge and a central recess or chamber, substantially as set forth.

6. The herein-described improved sprinkler consisting of the cylindrical body having an inner thread, a perforated top or cap, and a central threaded rod having lower grooves or water-ways, a series of interchangeable diaphragms having central holes and radial slits of varying sizes, a beveled or dished washer, and a nut having a threaded central opening and a lower circular recess or chamber, substantially as set forth.

In testimony whereof I have signed this specification in the presence of two subscribing witnesses.

HIRAM BOND EVEREST.

Witnesses:
MERCY E. EVEREST,
CHAS. M. EVEREST.